United States Patent
Derr

(10) Patent No.: US 6,237,532 B1
(45) Date of Patent: May 29, 2001

(54) DISPOSABLE PET FOOD SERVER WITH DETACHABLE FOOD CHAMBER

(76) Inventor: Dedric Michal Derr, 2420 Bismarck Ave., Loveland, CO (US) 80538

(*) Notice: Subject to any disclaimer, the term of this patent is extended or adjusted under 35 U.S.C. 154(b) by 0 days.

(21) Appl. No.: 09/443,579

(22) Filed: Nov. 18, 1999

(51) Int. Cl.[7] ..................................................... A01K 5/01
(52) U.S. Cl. ........................................... 119/51.01; 119/61
(58) Field of Search .............................. 119/51.01, 51.03, 119/59, 61; D30/121, 129

(56) References Cited

U.S. PATENT DOCUMENTS

| | | | |
|---|---|---|---|
| 2,813,509 | * 11/1957 | Bruno | 119/51.01 |
| 3,611,998 | * 10/1971 | Loscalzo | 119/61 |
| 4,716,855 | * 1/1988 | Andersson et al. | 119/61 |
| 5,105,768 | * 4/1992 | Johnson | 119/61 |
| 5,346,710 | * 9/1994 | Geitner | 119/61 |
| 5,947,056 | * 9/1999 | Zarski | 119/61 |

* cited by examiner

Primary Examiner—Charles T. Jordan
Assistant Examiner—Elizabeth Shaw
(74) Attorney, Agent, or Firm—William E. Hein

(57) ABSTRACT

A disposable pet food bowl in combination with a removable food chamber containing a pre-packaged serving of pet food to facilitate feeding a pet in a manner that is sanitary, quick, and easy.

4 Claims, 2 Drawing Sheets

DISPOSABLE PET FOOD SERVER WITH DETACHABLE FOOD CHAMBER

BACKGROUND AND SUMMARY OF THE INVENTION

This invention relates generally to pet food servers and, more particularly, to a pet food server that includes a removable food chamber which contains a pre-packaged serving of pet food.

Feeding a dog or cat is presently a time consuming and messy chore. First, the pet's food bowl, which has been attracting insects since its use the previous day, must be cleaned with water, soap, and a rag or brush. After cleaning the food bowl, the pet owner must then open a can of pet food, and risk cutting his or her finger on the sharp edge of the can lid when doing so. The owner must either keep a dedicated can opener nearby or use the family kitchen can opener, which carries the inherent risk of contaminating human food contained in a can that is subsequently opened with the same opener. After opening a can of pet food, other dedicated or kitchen utensils must be employed to transfer the food from the can to the pet's bowl. This step of transferring canned pet food is so distasteful that many pet owners feed only dry pet food. In the five or more minutes required to prepare food for feeding, the hungry pet is typically nervous and interfering.

It would therefore be advantageous to provide, in accordance with the illustrated preferred embodiment of the present invention, a disposable pet food bowl in combination with a removable food chamber containing a pre-packaged serving of pet food to facilitate feeding a pet in a manner that is sanitary, quick, and easy.

DETAILED DESCRIPTION OF THE PREFERRED EMBODIMENT

Figure 1:
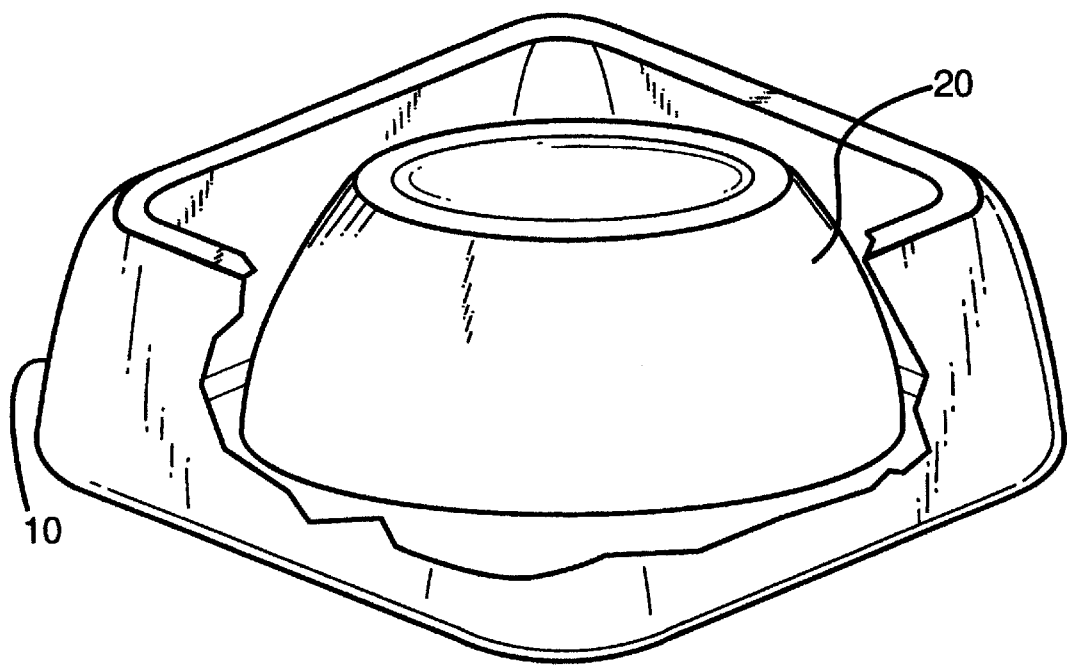
FIG. 1 is a partially cut away pictorial diagram of a disposable pet food server in combination with a removable food chamber containing a pre-packaged serving of pet food, in accordance with the present invention.
Figure 2:
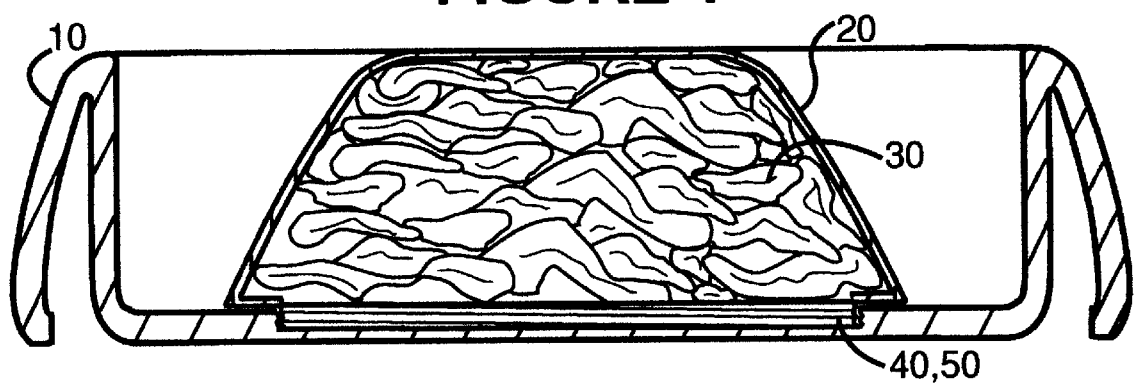
FIG. 2 is a cross-sectional diagram of the disposable pet food server of FIG. 1 in which removable attachment of the food chamber is accomplished by means of male threads thereon that mate with female threads provided in the floor of the food server.
Figure 3:
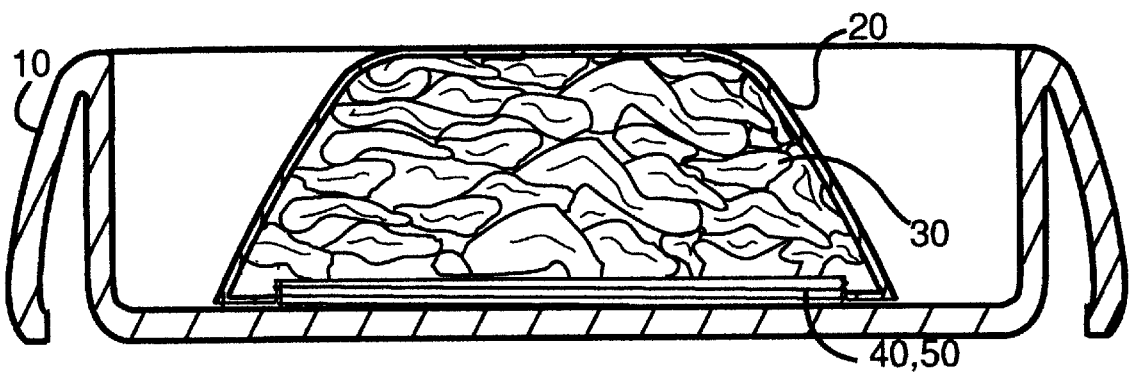
FIG. 3 is a cross-sectional diagram of the disposable pet food server of FIG. 1 in which removable attachment of the food chamber is accomplished by means of female threads thereon that mate with male threads provided in the floor of the food server.

Referring now to FIGS. 1–3, there is shown a disposable pet food server 10 generally in the form of a conventional pet food bowl. A food chamber 20 containing a pre-packaged serving of pet food 30 is removably attached in an upside down position inside food server 10 in such a way as to provide a seal therebetween to prevent spoilage of the pet food 30 contained within food chamber 20. Removable attachment of food chamber 20 with food server 10 may be by way of male threads 40 provided in the downward facing edge of food chamber 20 that mate with female threads 50 formed in the bottom inside surface of food server 10, as illustrated in FIG. 2. Alternatively, this may be accomplished by way of female threads 50 provided in the downward facing edge of food chamber 20 that mate with male threads 40 extending upwardly from the bottom inside surface of food server 10, as illustrated in FIG. 3. Any of a number of conventional methods for removably attaching food chamber 20 to food server 10 may be instead employed. Exemplary of these methods are tear-away strips, adhesive strips, and mechanisms like those employed to releasably secure caps to medicine bottles.

Figure 4:
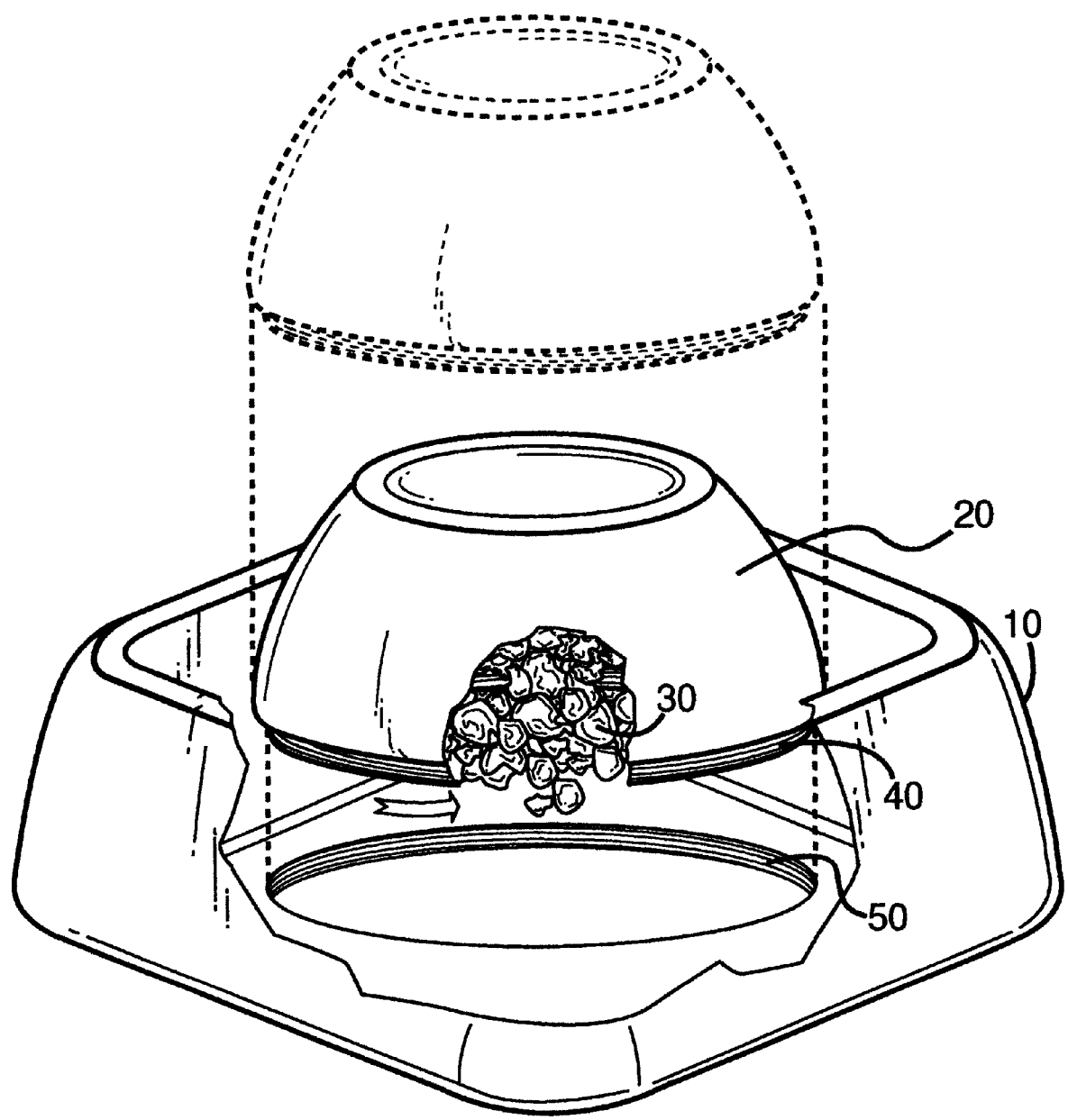
FIG. 4 is an exploded partially cut away pictorial diagram of the disposable pet food server of FIG. 1 illustrating the way in which the food chamber is removed from the food server to expose the pet food to be served.

It is envisioned that the combined disposable pet food server 10 and removable food chamber 20 filled with a serving of pet food 30 will be pre-packaged by pet food manufacturers. As illustrated in FIG. 4, the pet owner simply unscrews the food chamber 20 from food server 10 to allow the pre-packaged serving of pet food 30 to fall to the floor of food server 10, ready for consumption by a pet. If desired, finger grooves may be provided in the outer surface of food chamber 20 to allow the user to maintain a firmer grip when removing it from food server 10. Both the food server 10 and the food chamber 20 are discarded after use.

I claim:

1. A disposable pet food dispenser comprising:

a pet food server having a central bowl area from which a serving of pet food may be consumed by a pet; and a food chamber containing a pre-packaged serving of pet food, the food chamber being removably sealed in an upside down position to the bowl area of the food server such that the pre-packaged serving of pet food is exposed for consumption by the pet following removal of the food chamber.

2. A disposable pet food dispenser as in claim 1, wherein the food chamber is removably sealed to the food server by means of mating threads provided both along a bottom edge of the food chamber and within the bowl area of the food server.

3. A method for feeding a pet, the method comprising:

providing a disposable pet food server having a central bowl area;

providing a disposable food chamber containing a pre-packaged serving of pet food, the food chamber being removably sealed in an upside down position to the bowl area of the food server; and removing the food chamber from the food server to thereby expose the pre-packaged serving of pet food for consumption from the bowl area.

4. A method for providing a single serving of pet food, the method comprising:

providing a disposable pet food server having a central bowl area; and providing a disposable food chamber containing a pre-packaged serving of the pet food, the food chamber being removably sealed in an upside down position to the bowl area of the food server.

* * * * *